C. Boernicke,
Wood Auger.
Nº 63,842.   Patented Apr. 16, 1867.

Witnesses
Theo Tusche
Wm Treurn

Inventor.
Ch. Boernicke
Per Munn & Co
Attorneys

United States Patent Office.

CHARLES BOERNICKE, OF PHILADELPHIA, PENNSYLVANIA.

Letters Patent No. 63,842, dated April 16, 1867.

IMPROVEMENT IN WOOD-BORING BITS.

The Schedule referred to in these Letters Patent and making part of the same.

TO ALL WHOM IT MAY CONCERN:

Be it known that I, CHARLES BOERNICKE, of Philadelphia, in the county of Philadelphia, and State of Pennsylvania, have invented a new and useful Improvement in Augers; and I do hereby declare that the following is a full, clear, and exact description thereof, which will enable those skilled in the art to make and use the same, reference being had to the accompanying drawings, forming part of this specification.

The object of this invention is to arrange an auger so that the hole bored may be gradually enlarged at the bottom, for the purpose of more securely joining two pieces of wood together.

The invention consists in the use of a hollow shank for the auger, in which a rod is pivoted, which is provided at its lower end with a horizontal cutter, the latter projecting through the auger. The upper end of the aforesaid rod may be pressed in after the hole has been bored a sufficient length. The movable cutter is then pressed out gradually, and the hole is then made larger by means of this cutter being pressed out, the diameter of the hole increasing towards the end. A tenon may then be inserted into the hole, with a wedge or conical pin attached to its lower end; and, as the said wedge or pin strikes the bottom of the hole, the tenon being forced down, the wedge or pin is pressed into the tenon, spreading the end of the same, so as to fit into the larger tapering portion of the hole. The tenon is then very securely fixed, and cannot be again removed from the hole. In the annexed drawing my invention is illustrated—

Figure 1:
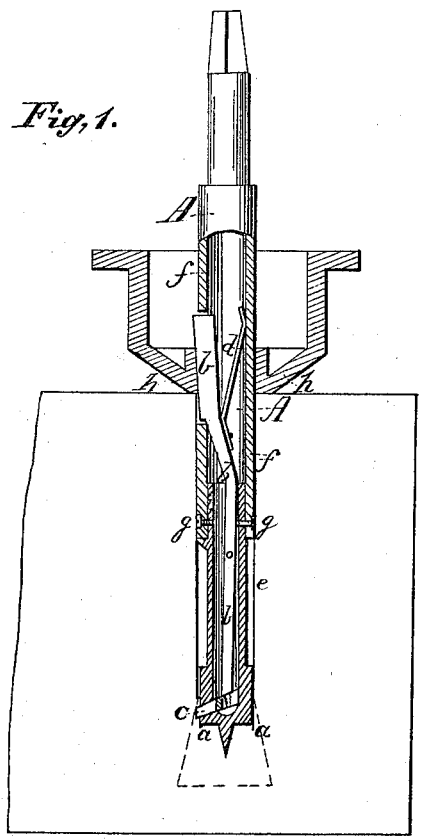

Figure 1 being a side view of my improved auger, partly in section.

Figure 2:
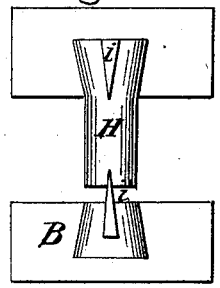

Figure 2 is a sectional view of two pieces of wood, showing the shape of the hole bored by my auger, and the manner of securing a tenon therein.

Similar letters of reference indicate corresponding parts.

The auger A is tubular, as shown in fig. 1. Its cutters $a$ $a$ are of usual construction. Within the same is pivoted a rod, $b$, which is provided at its lower end with a horizontal (or nearly so) cutter, $c$. At its upper end it is bent a little, as shown, so as to project through a slot in the shell of the auger, and it is pressed out by a spring, $d$, arranged in the auger, as shown, so as to draw the cutter $c$ into the auger as much as possible. To facilitate the pivoting of the rod to the auger it will be best to make the latter of two pieces, $e$ and $f$, as shown, which are then firmly connected to each other by means of screws $g$, or otherwise. This auger will bore a hole like any other auger until the upper end of the rod $b$ is pressed in by any suitable device, the cutter $c$ being thus pressed out, when the hole will be enlarged. The best device would be to arrange a ring, $h$, fitting loosely around the auger, and lying upon the block of wood to be operated on. The height of this ring has to be arranged in accordance with the required length of the hole. As shown in fig. 1, the hole is beginning to be wider after having been made perpendicular to a considerable length. If holes were required to begin to taper at once, as in fig. 2, the ring would have to be as high as the lower part of the auger, from the lower end of the same to where the rod $b$ begins to project. The rod $b$ projects beyond the auger in an inclined line, so that it will be gradually operated upon by the ring $h$, thereby making the tapering hole which is shown in fig. 2. When the hole is finished, as in the block B in fig. 2, a wedge or conical pin, $i$, is partly inserted in the lower end of the tenon K, just enough to be held therein, as seen at the lower end of the tenon K in fig. 2. The tenon is then forced into the hole, and as $i$ strikes the bottom of the hole it is forced into the tenon, thereby spreading the same, as shown at the upper end of the tenon in fig. 2. The tenon will then be firmly held in the wood, and cannot be removed therefrom. This invention will be of great value for carpenters, joiners, and shipbuilders, especially, on account of its simplicity and cheapness, and because it can be operated easily.

I claim as new, and desire to secure by Letters Patent—

The construction and arrangement of the tube A, composed of the slotted parts $e$ $f$, within which is pivoted the rod $b$, provided at its lower end with the horizontal cutter $c$, working through the slot near the lower end of the tube A, its upper end bent so as to project in an inclined line through the slot in the upper part of the tube A, and held outwardly by means of the spring $d$, as herein set forth for the purpose specified.

CHARLES BOERNICKE.

Witnesses:
   LOUIS C. LUNING,
   THEODOR SCHAFER.